(12) United States Patent
Laroche et al.

(10) Patent No.: US 12,492,645 B2
(45) Date of Patent: Dec. 9, 2025

(54) ASSEMBLY FOR A TURBINE ENGINE FAN CASE AND AN AIR INLET, METHOD FOR USING SUCH AN ASSEMBLY

(71) Applicant: Safran Aircraft Engines, Paris (FR)

(72) Inventors: Clement Raphael Laroche, Paris (FR); Ulrich Vincent Max Dubois, Moissy-Cramayel (FR); Kevin Emilien Andre Minjot, Moissy-cramayel (FR); Vincent Fameau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 25 days.

(21) Appl. No.: 18/555,279

(22) PCT Filed: Jun. 2, 2022

(86) PCT No.: PCT/EP2022/065134
§ 371 (c)(1),
(2) Date: Oct. 13, 2023

(87) PCT Pub. No.: WO2022/258497
PCT Pub. Date: Dec. 15, 2022

(65) Prior Publication Data
US 2024/0200464 A1 Jun. 20, 2024

(30) Foreign Application Priority Data
Jun. 10, 2021 (FR) ..................................... 2106103

(51) Int. Cl.
*F01D 11/12* (2006.01)
*F01D 7/00* (2006.01)

(52) U.S. Cl.
CPC .............. *F01D 11/122* (2013.01); *F01D 7/00* (2013.01); *F05D 2220/36* (2013.01)

(58) Field of Classification Search
CPC ............................. F01D 11/122; F01D 11/127
See application file for complete search history.

(56) References Cited

U.S. PATENT DOCUMENTS 3,873,236 A * 3/1975 Gall .......................... F01D 7/00
416/162
9,243,647 B2 * 1/2016 Evans ................... F04D 29/526
(Continued)

FOREIGN PATENT DOCUMENTS

| EP | 2570676 | 3/2013 |
|---|---|---|
| EP | 2876289 | 5/2015 |
| WO | 2019110936 | 6/2019 |

OTHER PUBLICATIONS

International Search Report from Corresponding International Application No. PCT/EP2022/065134, dated Sep. 13, 2022, 5 pages.
(Continued)

*Primary Examiner* — Courtney D Heinle
*Assistant Examiner* — Danielle M. Christensen
(74) *Attorney, Agent, or Firm* — RANKIN, HILL & CLARK LLP

(57) ABSTRACT

An assembly for a turbine engine fan case and an air inlet, in particular for an aircraft. The turbine engine extending along a longitudinal axis and comprising at least one fan mounted so as to be rotatable about the longitudinal axis. The fan case comprising at least a first peripheral lining. The first peripheral lining being made of an abradable material configured to be capable of being worn out during the rotation of the fan. The air inlet comprising at least one second peripheral lining. The second peripheral lining being made of an abradable material configured to be capable of being worn out during the rotation of the fan.

15 Claims, 4 Drawing Sheets

(56) References Cited

U.S. PATENT DOCUMENTS

| | | | |
|---|---|---|---|
| 9,533,454 B2 * | 1/2017 | Konigs | F01D 11/122 |
| 10,801,339 B2 | 10/2020 | Lopez Guzman | |
| 2005/0082112 A1 * | 4/2005 | Harrison | F02K 1/827 |
| | | | 181/210 |
| 2021/0054762 A1 * | 2/2021 | Ivakitch | F04D 19/02 |

OTHER PUBLICATIONS

French Search Report from Corresponding French Application No. FR2106103, dated Feb. 4, 2022, 2 pages.

* cited by examiner

ASSEMBLY FOR A TURBINE ENGINE FAN CASE AND AN AIR INLET, METHOD FOR USING SUCH AN ASSEMBLY

TECHNICAL FIELD

The present invention relates to the field of turbine engines for aircraft, in particular, a propulsion assembly comprising a turbine engine comprising a fan that comprises variable-pitch blades.

In a known manner, in reference to FIG. 1, an aircraft turbine engine 100 extends along a longitudinal axis X and comprises a fan 101, rotatably mounted so as to be rotatable about said longitudinal axis X, which makes it possible to move the aircraft from an air flow entering the turbine engine 100 and circulating from upstream to downstream. In the following, the terms "upstream" and "downstream" are defined with respect to the longitudinal axis X oriented from upstream to downstream. Similarly, the terms "inner" and "outer" are defined according to the radial direction with respect to the longitudinal axis X. In a known manner, the turbine engine 100 comprises a compressor, a combustion chamber and a turbine to rotate the compressor. In this example, the turbine engine 100 is a bypass turbine engine with a dilution ratio greater than 16.

The fan 101 comprises a plurality of blades 111. Each blade 111 extends radially with respect to the longitudinal axis X and comprises a free tip at its distal end. In reference to FIG. 2, each blade 111 further comprises a leading edge BA and a trailing edge BF. In a known manner, the turbine engine 100 comprises a fan case 102 extending longitudinally along the longitudinal axis X and wherein the fan 101 is mounted. The fan case 102 delimits an annular cavity for circulating the air flow. In a known manner, the fan case 102 comprises an upstream flange 121 intended to allow the mounting upstream of a nacelle air inlet (not shown). In a known manner, such an air inlet has a function of guiding the air flow into the fan case 102. Specific treatments also make it possible to participate in reducing the noise pollution of the propulsion assembly.

In reference to FIG. 2, in order to achieve optimum compression, it is necessary to reduce the radial clearance between the tip of the fan blades 111 and the fan case 102. For this purpose, it is known to have an abradable peripheral lining RAA on the radially inner wall of the fan case 102. During turbine engine operation, a superficial layer of this abradable lining RAA detaches by friction when the blades 111 pass. In practice, as shown in FIGS. 2 and 3, the abradable lining RAA covers a longitudinal length LA that is slightly greater than the contact zone ZA of the tip of the blades 111. Friction is not continuous but may occur in certain situations (dilations, gaps, shocks, etc.).

In order to avoid the use of bulky and heavy thrust-reversing systems, it was proposed to use a fan comprising variable-pitch blades. In practice, each blade may rotate on a radial axis so as to modify the position of its leading edge BA and of its trailing edge BF. In other words, while the positions of the leading and trailing edge were identical for a conventional fan, the positions of the leading and trailing edge may vary depending on the pitch angle for a fan comprising variable-pitch blades. This results in that the length and position of the contact zone ZA of the tip of the blades 111 varies according to the pitch angle.

In order to allow optimum compression, it was proposed to provide a long-length abradable lining so as to be able to extend adjacent to the tip of the blades 111 for any pitch angle. To house the abradable lining of increased length, it was proposed to lengthen the fan case 102, but this has disadvantages as this increases the mass of the turbine engine as well as its size. In addition, such a lengthening would prevent any dismounting of the blades of the fan.

Thus, the invention aims to eliminate at least some of these disadvantages.

SUMMARY

The invention relates to an assembly of a fan case of a turbine engine, in particular of an aircraft, and an air inlet, the turbine engine extending along a longitudinal axis and comprising at least one fan mounted so as to be rotatable about the longitudinal axis, the fan case comprising at least one first peripheral lining, the first peripheral lining being made of an abradable material configured to be capable of being worn out during the rotation of the fan.

The assembly is remarkable in that the air inlet comprises at least one second peripheral lining, the second peripheral lining being made of an abradable material configured to be capable of being worn out during the rotation of the fan.

Thus, the peripheral lining is partly mounted on the fan case and partly on the nacelle air inlet, which makes it possible to reduce the length of the fan case and therefore its mass. Such an assembly is particularly suitable for a fan comprising variable-pitch blades. Mounting an abradable lining on an air inlet overcomes a prejudice that a bradable lining was borne only by a structural member (fan case), not by a nacelle. Mounting the same abradable lining on different elements (nacelle and turbine engine) and assembled in a relative manner contradicts common practices and allows for dismounting blades of the fan by dismounting the air inlet.

Preferably, the first peripheral lining and the second peripheral lining are made of the same abradable material. Thus, the first peripheral lining and the second lining together form the same overall lining.

Preferably, as the fan case and air inlet are joined together, the first peripheral lining and the second peripheral lining are adjacent. Preferably, the first peripheral lining and the second peripheral lining are continuous with each other so as to avoid the formation of a heterogeneous interface.

Preferably, the first peripheral lining extends to the upstream end of the fan case. More preferably, the second peripheral lining extends to the downstream end of the air inlet.

According to one aspect of the invention, the first peripheral lining having a first length, the second peripheral lining having a second length, the ratio of the second length to the first length is greater than 20%, preferably 30%, more preferably 50%. Preferably, the ratio of the second length to the first length is between 20% and 70%. Such a second peripheral lining makes it possible to provide compression for particular pitch angles while retaining a reduced length fan case.

The invention also relates to an assembly comprising a turbine machine, in particular for aircraft, comprising a fan case and an air inlet as presented previously, the turbine engine extending along a longitudinal axis and comprising at least one fan mounted so as to be rotatable about the longitudinal axis configured to be able to come into contact with at least one of the peripheral linings. During operation, the fan of the turbine engine may come into contact with one or more peripheral linings.

Preferably, the fan comprises variable-pitch blades. Depending on the pitch angle, the contact zone with the peripheral lining is not at the same position and does not have the same length. The presence of the second lining makes it possible to provide a contact during the modification of the pitch angle compared to a usual pitch angle.

According to one aspect of the invention, the fan defining a first pitch angle corresponding to an operation of the turbine engine in direct flow, the fan is configured to be able to come into contact only with the first peripheral lining for the first pitch angle. As a result, in direct flow, the blades of the fan only come into contact with the first peripheral lining mounted on the fan case. In other words, only the fan case is stressed during the operation of the turbine engine in direct flow, which increases the service life.

According to one aspect of the invention, the fan defining a second pitch angle corresponding to reverse flow operation of the turbine engine, the fan is configured to be able to come into contact with the second peripheral lining for the second pitch angle. When operating the turbine engine in reverse flow, the second peripheral lining is stressed, in particular, alone or with the first peripheral lining. The stress remains periodic, with the contact zone mainly remaining on the first lining.

The invention also relates to a method for using an assembly such as presented previously, comprising a step of rotating the fan during which the blades come into contact with the first peripheral lining and/or the second peripheral lining.

Preferably, the fan comprising variable-pitch blades, the method comprising:
- a step of rotating the fan for a first pitch angle of the blades during which the blades come into contact only with the first peripheral lining, and
- a step of rotating the fan for a second pitch angle of the blades during which the blades come into contact with the second peripheral lining.

DESCRIPTION OF THE DRAWINGS

The invention will be better understood upon reading the following description, given as an example, and in reference to the following figures, given as non-limiting examples, wherein identical references are given to similar objects.

It should be noted that the figures set out the invention in detail in order to implement the invention, said figures may of course be used to better define the invention where applicable.

DETAILED DESCRIPTION

Figure 1:
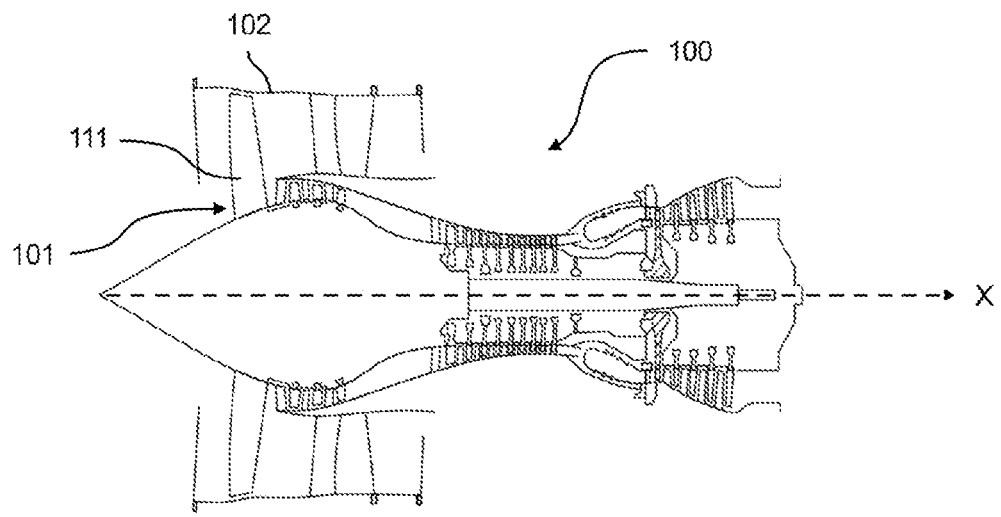
FIG. 1 is a schematic representation in a longitudinal cross-section of a turbine engine according to the prior art.
Figure 2:
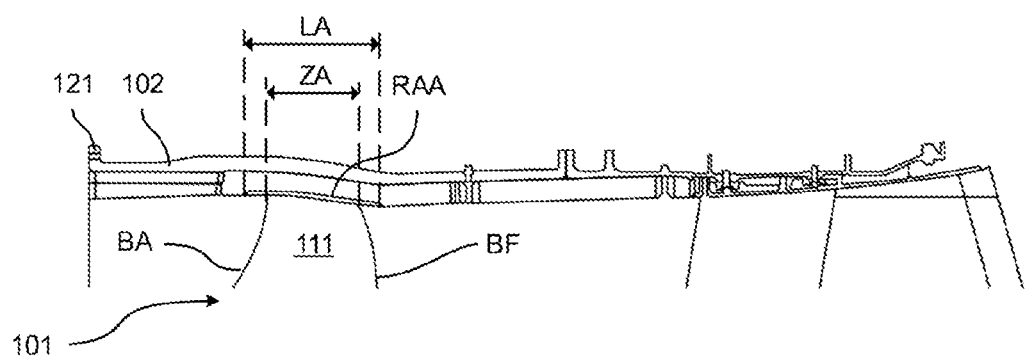
FIG. 2 is a schematic representation in a close-up longitudinal cross-section of a fan case with an abradable peripheral lining according to the prior art.
Figure 3:
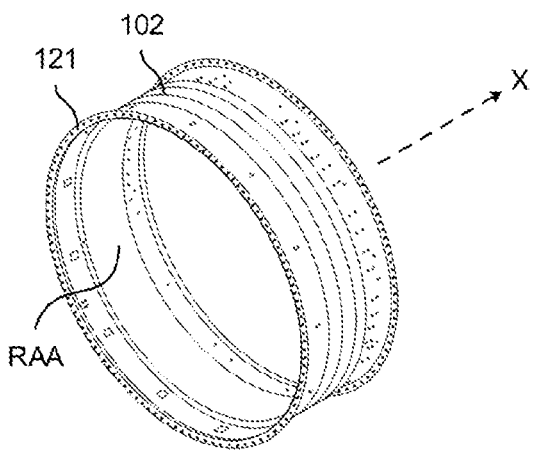
FIG. 3 is a schematic representation in perspective of a fan case according to the prior art.
Figure 4:
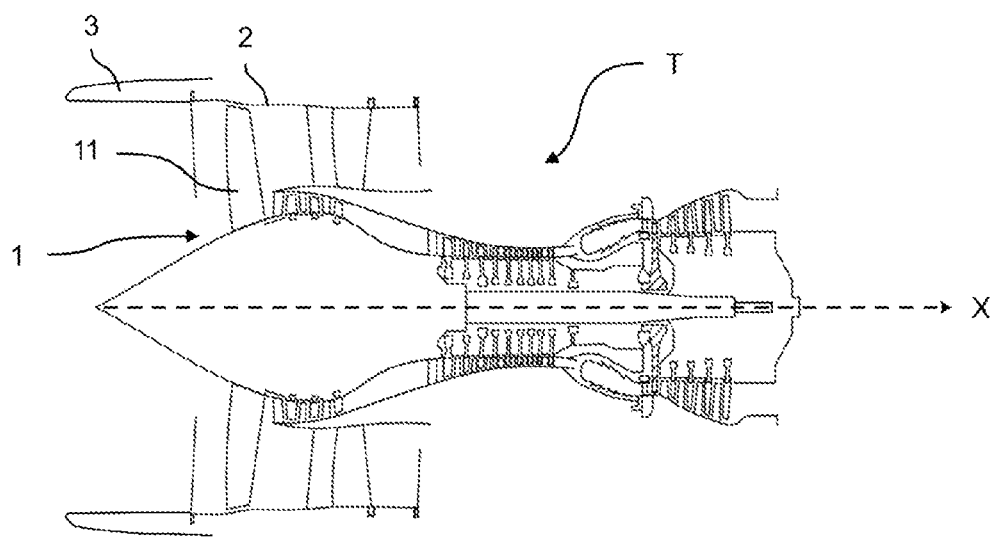
FIG. 4 is a schematic representation in a longitudinal cross-section of a turbine engine according to the invention.

In reference to FIG. 4, the invention will be presented for an aircraft turbine engine T, in particular, a turbojet. The turbine engine T extends along a longitudinal axis X and comprises a fan 1 mounted so as to be rotatable about the longitudinal axis X and which makes it possible to move the aircraft from an air flow entering into the turbine engine T and circulating from upstream to downstream. In the following, the terms "upstream" and "downstream" are defined with respect to the longitudinal axis X oriented from upstream to downstream. Likewise, the terms "inner" and "outer" are defined according to the radial direction with respect to the longitudinal axis X. In a known manner, the turbine engine T comprises a compressor, a combustion chamber and a turbine to rotate the compressor. Preferably, the turbine engine T is a bypass type and has a dilution ratio greater than 16.

Figure 5:
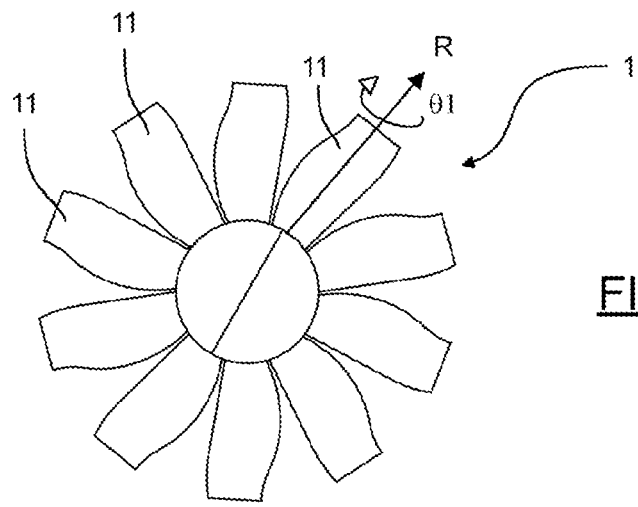
FIG. 5 is a front schematic representation of a fan with variable-pitch blades according to a first pitch angle corresponding to a first contact zone.
Figure 6:
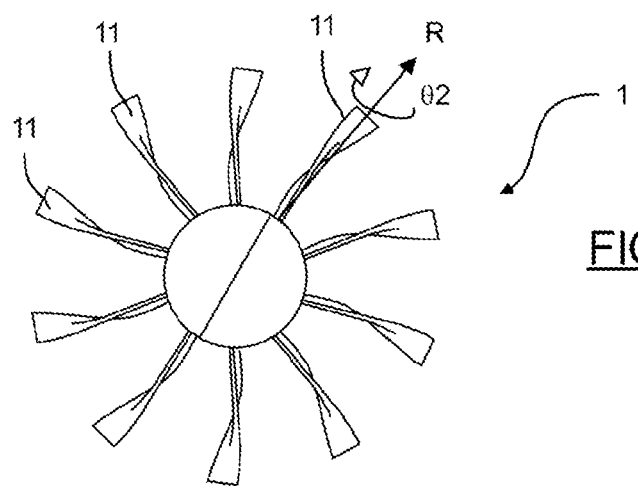
FIG. 6 is a front schematic representation of a fan with variable-pitch blades according to a second pitch angle corresponding to a second contact zone.

In this example, the fan 1 comprises variable-pitch blades 11. In other words, each blade 11 is movable about a radial axis R according to different pitch angles $\theta$. In a known manner, each blade 11 comprises a tip that is intended to come into contact with an abradable lining according to a longitudinal contact zone. In reference to FIG. 5, the fin 1 may have its blades 11 oriented according to a first pitch angle $\theta 1$ defining a first longitudinal contact zone with the abradable lining. Likewise, in reference to FIG. 6, the fan 1 may have its blades 11 oriented according to a second pitch angle $\theta 2$ defining a second longitudinal contact zone with the abradable lining. When the aircraft is flying, the pitch angle of the blades 11 of the fan 1 of the turbine engine T is modified, in particular, in the event of a thrust reversal. The length and position of each contact zone is modified according to the pitch angle.

Figure 7:
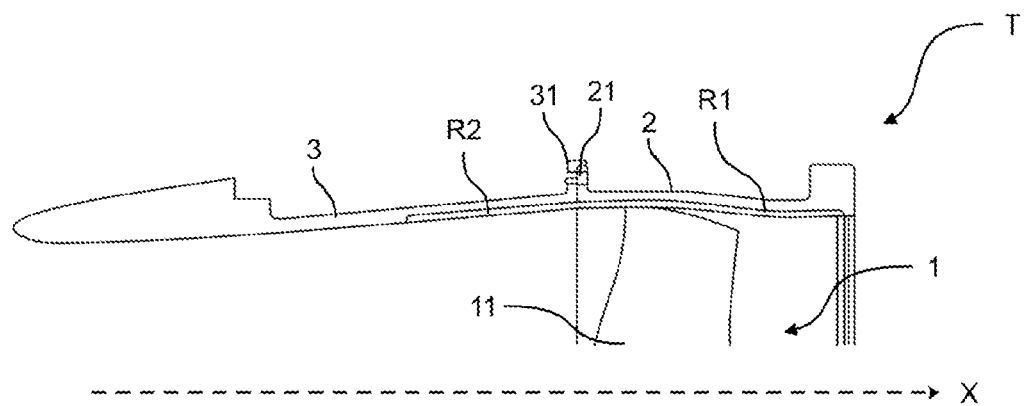
FIG. 7 is a schematic representation in longitudinal cross-section of an assembly of a fan case and an air inlet of a turbine engine according to the invention.

In reference to FIG. 7, the turbine engine T comprises an assembly of a fan case 2 and a nacelle air inlet 3 mounted upstream of the fan case 2. Preferably, the air inlet 3 is non-structural and does not make it possible to transmit thrust forces. Unlike a conventional turbine engine wherein the blades 11 of the fan 1 are in contact only with an abradable peripheral lining mounted on the fan case 2, the present invention contradicts the prejudices established by proposing to mount an abradable peripheral lining partly on the fan case 2 and partly on the air inlet 3. The nacelle air inlet 3, which conventionally has no interaction with the blades 11, makes it possible to support a portion of the abradable peripheral lining. This advantageously makes it possible to avoid lengthening the fan case 2 and to reduce the mass and size of the turbine engine T. In addition, this makes it possible to facilitate dismounting of the blades 11 of the fan 1 following dismounting of the nacelle, in particular the air inlet 3.

Figure 8:
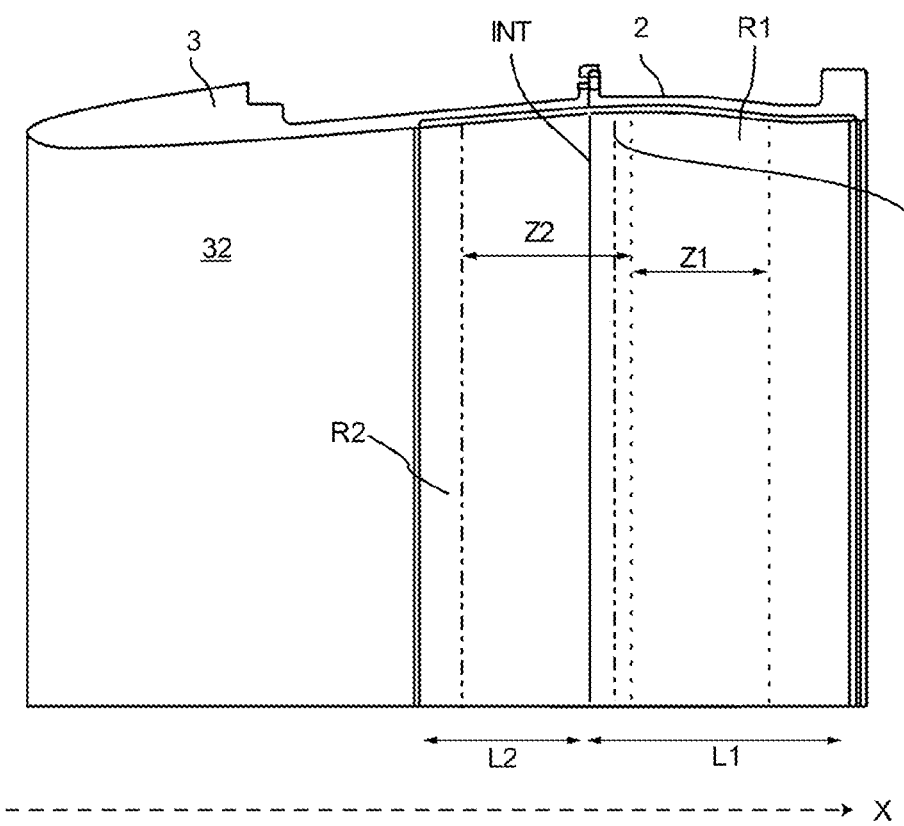
FIG. 8 is a schematic representation in perspective from the inside of an assembly of a fan case and an air inlet of a turbine engine according to the invention.

In reference to FIGS. 7 and 8, the fan case 2 comprises a first peripheral lining R1 which is mounted on an inner surface and positioned opposite the fan 1 for at least a certain range of pitch angles. The first peripheral lining R1 is made of an abradable material configured to capable of being worn out during the rotation of the fan 1.

Similarly, the air inlet 3 comprises a second peripheral lining R2, which is mounted on an inner surface and positioned opposite the fan 1 for at least a certain range of pitch angles. The second peripheral lining R2 is made of an abradable material configured to be capable of being worn out during potential friction during the rotation of the fan 1. In this embodiment, the peripheral linings R1, R2 are made of the same material, but it goes without saying that they could be made of different materials.

The fan case 2 comprises at its upstream end an upstream fastening member 21, in particular a flange. Similarly, the air inlet 3 comprises at its downstream end a downstream fastening member 31, in particular a flange, configured to cooperate with the upstream fastening member 21 of the fan case 2. Thus, the air inlet 3 may be mounted in a similar way to the prior art.

Preferably, the first peripheral lining R1 extends to the upstream end of the fan case 2 in order to provide a continuity at the interface with the air inlet 3. Similarly, the second peripheral lining R2 of the air inlet 3 extends to the downstream end of the air inlet 3. When fitting the air inlet 3 to the fan case 2, the peripheral linings R1, R2 are adjacent and preferably continuous so as to have a smooth and aerodynamic surface. Preferably, following mounting, a machining step is carried out at the interface INT (FIG. 8) in order to ensure optimum continuity.

Preferably, in reference to FIG. 8, the air inlet 3 comprises an acoustically treated wall 32 upstream of the second abradable peripheral lining R2 so as to limit the noise pollution to the propulsion assembly.

In reference to FIG. 8, the first peripheral lining R1 has a first length L1 and the second peripheral lining R2 has a second length L2. The ratio Q is defined as the ratio of the second length L2 to the first length L1. The ratio Q is preferably greater than 20%, preferably greater than 30%, more preferably greater than 50%. Preferably, the ratio Q is less than 70% to limit the overall length of the lining. Such a ratio Q depends in particular on the distance between the rotation axis of the blade and its trailing edge.

FIG. 8 shows, on the one hand, the first contact zone Z1 for the first pitch angle $\theta 1$ and, on the other hand, the second contact zone Z2 for the second pitch angle $\theta 2$. The second contact zone Z2 is located upstream of the first contact zone Z1 and preferably has a longer length than the first contact zone Z1.

Preferably, for the first pitch angle $\theta 1$, the first contact zone Z1 is located only on the first peripheral lining R1. Advantageously, the first pitch angle $\theta 1$, corresponding to the pitch in direct flow, is the most used during operation of the turbine engine T and allows the blades 11 to be in contact only with the first peripheral lining R1 of the fan case 2. Thus, most of the time, the blades 11 do not apply any force to the second peripheral lining R2 of the air inlet 3 for the first pitch angle $\theta 1$, which is advantageous.

Advantageously, it is only when the pitch angle is modified that the second peripheral lining R2 is used. In reference to FIG. 8, for the second pitch angle $\theta 2$ corresponding to reverse flow pitch, the second contact zone Z2 is distributed over the two peripheral linings R1, R2.

When using the turbine engine T, the tip of the blades 11 are in contact only with the first peripheral lining R1 for the first pitch angle $\theta 1$ according to the first contact zone Z1. During the operation of the turbine engine T, the pitch angle is modified and the tip of the blades 11 may come into contact with the second peripheral lining R2, which is carried by the air inlet 3. The air compression carried out by the fan 11 is therefore optimal for any pitch angle without globally penalising the mass and size of the turbine engine T. In addition, the air inlet 3 may easily be removed to dismount the blades 11 of the fan 1.

The invention claimed is:

1. An assembly of an engine fan case and a nacelle air inlet for a turbine engine, the fan case and the nacelle air inlet being joined together, the turbine engine extending along a longitudinal axis and comprising at least one fan mounted so as to be rotatable about the longitudinal axis, the fan case comprising at least one first peripheral lining, the first peripheral lining being made of an abradable material configured to be capable of being worn out during the rotation of the fan, wherein the nacelle air inlet comprises at least one second peripheral lining, the second peripheral lining being made of an abradable material configured to be capable of being worn out during the rotation of the fan.

2. The assembly according to claim 1, wherein the first peripheral lining and the second peripheral lining are made of a same abradable material.

3. The assembly according to claim 1, wherein the first peripheral lining and the second peripheral lining are adjacent one another.

4. The assembly according to claim 1, wherein the first peripheral lining extends to an upstream end of the fan case.

5. The assembly according to claim 1, wherein the second peripheral lining extends to a downstream end of the nacelle air inlet.

6. The assembly according to claim 1, wherein the first peripheral lining defines a first length and the second peripheral lining defines a second length, and wherein a ratio of the second length to the first length is greater than 20%.

7. A turbine engine for an aircraft, the turbine engine comprising: the fan case and the nacelle air inlet according to claim 1, the turbine engine extending along the longitudinal axis and comprising the at least one fan mounted so as to be rotatable about the longitudinal axis configured to come into contact with at least one of the peripheral linings.

8. The turbine engine according to claim 7, wherein the fan comprises variable-pitch blades.

9. The turbine engine according to claim 7, the fan defines a first pitch angle corresponding to an operation of the turbine engine in direct flow, and wherein the fan is configured to be able to come into contact only with the first peripheral lining for the first pitch angle.

10. The turbine engine according to one of claim 7, the fan defines a second pitch angle corresponding to reverse flow operation of the turbine engine, and wherein the fan is configured to be able to come into contact with the second peripheral lining for the second pitch angle.

11. A method for using the turbine engine according to claim 7, comprising a step of rotating the fan during which blades of the fan come into contact with at least one of the first peripheral lining and the second peripheral lining.

12. The method for using the turbine engine according to claim 11, wherein the blades of the fan comprise variable-pitch blades, the method comprising:
rotating the fan for a first pitch angle of the blades during which the blades come into contact only with the first peripheral lining, and
rotating the fan for a second pitch angle of the blades during which the blades come into contact with the second peripheral lining.

13. The assembly according to claim 1, the fan case comprising at an upstream end thereof an upstream fastening member, wherein the nacelle air inlet comprises at a downstream end thereof a downstream fastening member configured to cooperate with the upstream fastening member of the fan case.

14. The assembly according to claim 1, wherein the first peripheral lining defines a first length and the second peripheral lining defines a second length, and wherein a ratio of the second length to the first length is greater than 30%.

15. The assembly according to claim 1, wherein the first peripheral lining defines a first length and the second peripheral lining defines a second length, and wherein a ratio of the second length to the first length is greater than 50%.

* * * * *